US011270000B1

United States Patent
Chiang et al.

(10) Patent No.: US 11,270,000 B1
(45) Date of Patent: Mar. 8, 2022

(54) GENERATION OF FILE DIGESTS FOR DETECTING MALICIOUS EXECUTABLE FILES

(71) Applicant: Trend Micro Incorporated, Tokyo (JP)

(72) Inventors: Chia-Ming Chiang, Taipei (TW); Po-Han Hao, Taipei (TW); Kuo-Cheng Wang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 260 days.

(21) Appl. No.: 16/676,649

(22) Filed: Nov. 7, 2019

(51) Int. Cl.
*G06F 21/51* (2013.01)
*G06F 21/56* (2013.01)

(52) U.S. Cl.
CPC ............ *G06F 21/564* (2013.01); *G06F 21/51* (2013.01); *G06F 21/565* (2013.01); *G06F 21/56* (2013.01); *G06F 21/562* (2013.01); *G06F 21/563* (2013.01)

(58) Field of Classification Search
CPC ...... G06F 21/564; G06F 21/51; G06F 21/565; G06F 21/56; G06F 21/562; G06F 21/563
See application file for complete search history.

(56) References Cited

U.S. PATENT DOCUMENTS

| | | | |
|---|---|---|---|
| 7,865,947 B2 | 1/2011 | Fanton et al. | |
| 8,375,450 B1 | 2/2013 | Oliver et al. | |
| 8,667,273 B1 * | 3/2014 | Billstrom | H04L 63/0428 713/165 |
| 8,769,683 B1 | 7/2014 | Oliver | |
| 8,925,087 B1 | 12/2014 | Oliver et al. | |
| 9,197,665 B1 | 11/2015 | Cabot et al. | |
| 9,361,458 B1 | 6/2016 | Feng et al. | |
| 9,690,937 B1 | 6/2017 | Duchin et al. | |
| 9,690,938 B1 | 6/2017 | Saxe et al. | |
| 10,162,967 B1 | 12/2018 | Oliver et al. | |
| 10,397,255 B1 * | 8/2019 | Bhalotra | H04L 63/1416 |
| 10,505,973 B2 * | 12/2019 | Kupreev | H04L 63/1483 |
| 2005/0021971 A1 * | 1/2005 | Patankar | G06F 21/57 713/176 |
| 2011/0093426 A1 * | 4/2011 | Hoglund | G06F 21/562 706/52 |

(Continued)

FOREIGN PATENT DOCUMENTS

EP    1 678 635 B1    10/2013

OTHER PUBLICATIONS

Trend Micro Security Intelligence Blog—How Machine Learning echniquest Helped US find Massive Certificate Abuse by BroweFox, Jun. 11, 2018, 8 pages, available at https://blog.trendmicro.com/trendlabs-security-intelligence/how-machine-learning-techniques-helped-us-find-massive-certificate-abuse-by-browsefox/.

(Continued)

*Primary Examiner* — Jayesh M Jhaveri
(74) *Attorney, Agent, or Firm* — Patrick D. Benedicto

(57) ABSTRACT

A cybersecurity server receives an executable file that has bytecode and metadata of the bytecode. Strings are extracted from the metadata, sorted, and merged into data streams. The data streams are merged to form a combined data stream. A digest of the combined data stream is calculated using a fuzzy hashing algorithm. The similarity of the digest to another digest is determined to detect whether or not the executable file is malware or a member of a malware family.

9 Claims, 7 Drawing Sheets

(56) References Cited

U.S. PATENT DOCUMENTS

| | | | | |
|---|---|---|---|---|
| 2016/0094564 | A1* | 3/2016 | Mohandas | H04L 63/145 726/24 |
| 2019/0007434 | A1* | 1/2019 | McLane | G06N 3/084 |
| 2020/0285737 | A1* | 9/2020 | Kraus | H04L 63/1416 |
| 2021/0117544 | A1* | 4/2021 | Kurtz | G06F 21/567 |

OTHER PUBLICATIONS

Wikipedia—Locality-sentive hashing, 8 pages [retrieved on May 20, 2019], retrieved from the internet: https://wikipedia.org/wiki/Locality-sensitive_hashing.

Joris Kinable, et al. "Malware Classification based on Call Graph Clustering", Aug. 27, 2010, pp. 1-12, Aalto University, Dept. of Information and Computer Science, Finland.

Swathi Pai, et al. "Clustering for malware classification", published online on Jan. 27, 2016, 13 pages, J Comput virol Hack Tech.

Peng Li, et al. "On Challenges in Evaluating Malware Clustering", 2010, 18 pages.

Kyle Soska, et al. "Automatic Application Identification from Billions of Files", Aug. 13, 2017, 10 pages.

Roberto Perdisci, et al. "VAMO: Towards a Fully Automated Malware Clustering Validity Analysis", Dec. 3-7, 2012, 10 pages.

PeHash: A Novel Approach to Fast Malware Clustering, Dec. 7, 2008, 8 pages.

Irfan Ui Haq, et al. "Malware Lineage in the Wild", Oct. 14, 2017, 15 pages.

Usha Narra "Clustering versus SVM for Malware Detection", May 2015, 71 pages, Master's Theses and Graduate Research, Dept. of Computer Science, San Jose State University, San Jose, California.

Mark Stamp "A Survey of Machine Learning Algorithms and Their Application in Information Security", Sep. 2018, 23 pages, San Jose State University, San Jose, California.

Jakub Lokoc, et al. "k-NN Classification of Malware in HTTPS Traffic Using the Metric Space Approach", Apr. 2016, 16 pages, SIRET research group, Dept. of Software Engineering, Charles University, Prague, Czech Republic.

Joy Nathalie Avelino, et al. "Ahead of the Curve: A Deeper Understanding of Network Threats Through Machine Learning", 2018, 17 pages, Trend Micro, A TrendLabs Research Paper.

Animesh Nandi, et al. "Anomaly Detection Using Program Control Flow Graph Mining from Execution Logs", Aug. 2016, 10 pages, IBM Research, IIT Kanpur.

Managed Detection and Response—Definition, 7 pages [retrieved on Jun. 14, 2019], retrieved from the internet https://www.trendmicro.com/vinfo/us/security/definition/managed-detection-and-response.

Cluster analysis—Wikipedia, 19 pages [retrieved on Jun. 11, 2019], retrieved from the internet: https://en.wikipedia.org/wiki/Cluster_analysis.

K-nearest neighbors algorithm—Wikipedia, 10 pages [retrieved on Jun. 11, 2019], retrieved from the internet https://en.wikipedia.org/wiki/K-nearest_neighbors_algorithm.

Autoencoder—Wikipedia, 6 pages [retrieved on Jun. 11, 2019], retrieved from the internet: https://en.wikipedia.org/wiki/Autoencoder.

DBSCAN—Wikipedia, 7 pages [retrieved on Jun. 11, 2019], retrieved from the internet: https://en.wikipedia.org/wiki/DBSCAN.

Jonathan Oliver, et al. "TLSH—A Locality Sensitive Hash", Nov. 21-22, 2013, 7 pages, The 4th Cybercrime and Trustworthy Computing Workshop, Sydney, AU.

Ban Xiaofang, et al. "Malware Variant Detection Using Similarity Search over Content Fingerprint", May 31-Jun. 2, 2014, 6 pages, IEEE The 26th Chinese Control and Decision Conference.

Computer Forensics, Malware Analysis & Digital Investigation: File Entropy explained, 4 sheetstr [retrieved on Oct. 31, 2019], retrieved from the internet: www.forensikb.com/2013/03/file-entropy-explained.html.

Using File Entropy to Identify "Ransomwared" Files—SANS Internet Storm Center, 5 sheets [retrieved on Oct. 31, 2019], retrieved from the internet: https://isc.sans.edu/forums/diary/Using+File+Entropy+to-Identify+Rasomwared+Files/21351/.

Entropy (information theory)—Wikipedia, 16 sheets [retrieved on Oct. 31, 2019], retrieved from the internet: https://en.wikipedia.org/wiki/Entropy_(information_theory).

Metada (CLI)—Wikipedia, 3 sheets [retrieved on Oct. 31, 2019], retrieved from the internet: https://en.wikipedia.org/wiki/Metadata_(CLI).

Metadata and Self-Describing Components—Microsoft Docs, Mar. 29, 2017, 7 sheets [retrieved on Oct. 31, 2019], retrieved from the internet: https://docs.microsoft.com/en-us/dotnet/standard/metadata-and-self-describing-components#metadata-and-the-pe-file-structure.

Kevin Burton "Physical Layout of a .NET Assembly", Feb. 14, 2002, 2 sheets [retrieved on Nov. 4, 2019], retrieved from the internet: www.informit.com/articles/article.aspx?p=25350&seqNum=3.

* cited by examiner

GENERATION OF FILE DIGESTS FOR DETECTING MALICIOUS EXECUTABLE FILES

REFERENCE TO RELATED APPLICATION

This application is related to U.S. application Ser. No. 16/672,924, filed on Nov. 4, 2019.

BACKGROUND OF THE INVENTION

1. Field of the Invention

The present invention relates generally to cybersecurity, and more particularly but not exclusively to generation of file digests.

2. Description of the Background Art

Malware may be detected using various antivirus techniques, including by looking for malware signatures. For example, antivirus researchers may collect samples of malware and analyze the samples to identify patterns indicative of malware. The patterns may be deployed in an endpoint computer to scan files for malware. The patterns may also be clustered to identify malware families.

Malware may be in the form of an executable file, such as in Portable Executable (PE) format for computers running the Microsoft Windows™ operating system. A digest of a malicious executable file may be calculated using a hashing algorithm. The digest may be used as a pattern for detection and clustering of malicious executable files. An ongoing problem with detecting malicious executable files is that there are multitudes of malicious executable files in the wild, and the number of mutated and new malicious executable files continues to rapidly increase.

SUMMARY

In one embodiment, a cybersecurity server receives an executable file that has bytecode and metadata of the bytecode. Strings are extracted from the metadata, sorted, and merged into data streams. The data streams are merged to form a combined data stream. A digest of the combined data stream is calculated using a fuzzy hashing algorithm. The similarity of the digest to another digest is determined to detect whether or not the executable file is malware or a member of a malware family.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
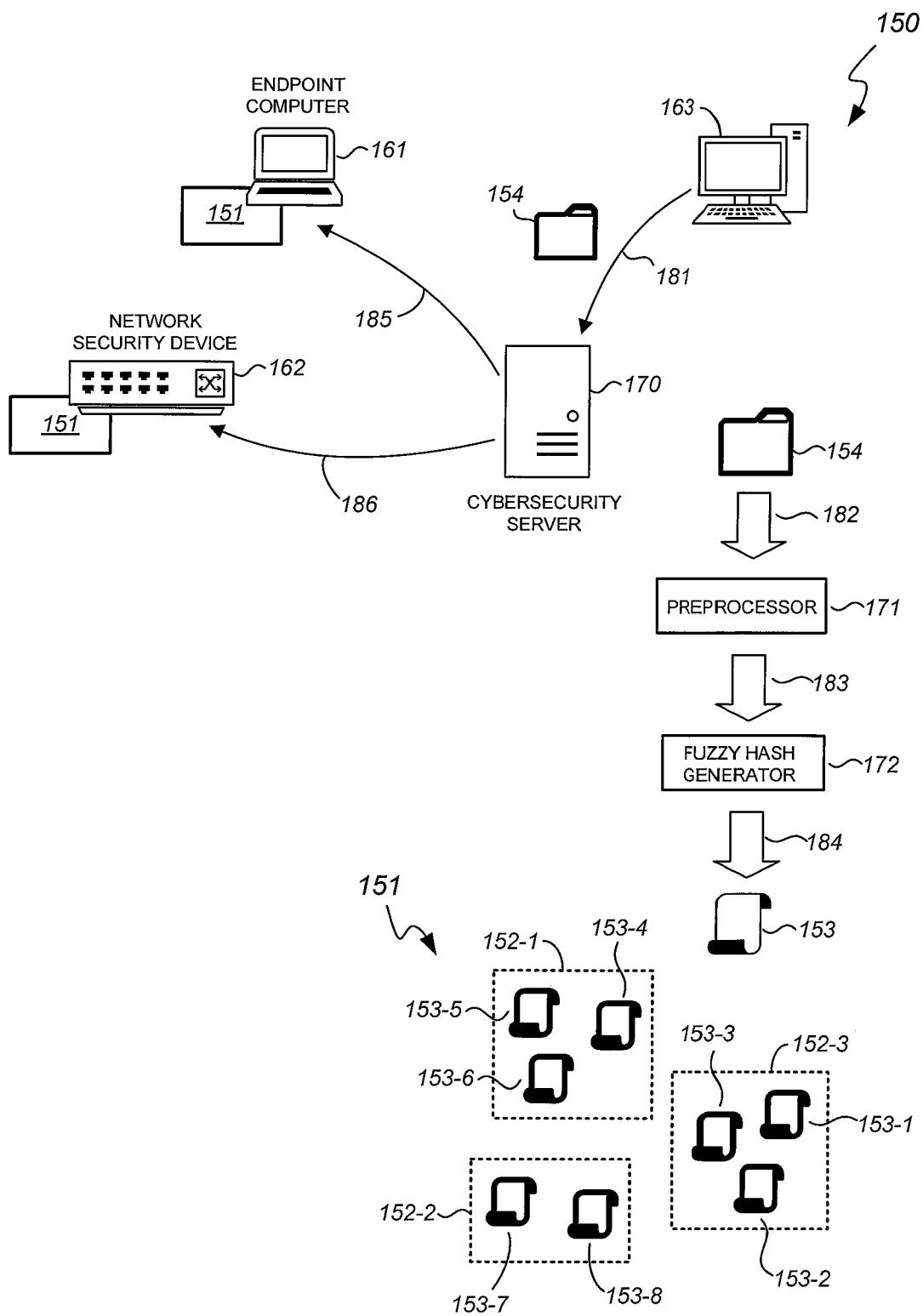
FIG. 1 shows a logical diagram of a system for identifying malicious executable files in accordance with an embodiment of the present invention.

FIG. 1 shows a logical diagram of a system 150 for identifying malicious executable files in accordance with an embodiment of the present invention. The system 150 is explained in the context of executable files that run under the .NET (also referred to as "dotnet") software framework for illustration purposes only. In light of the present disclosure, it can be appreciated that embodiments of the present invention are equally applicable to other executable files that have bytecode and metadata of the bytecode.

In the example of FIG. 1, the system 150 includes a cybersecurity server 170. The cybersecurity server 170 may comprise hardware and software of a cloud computing infrastructure, a dedicated server, or other computing device of a cybersecurity vendor, such as Trend Micro™, Incorporated. The cybersecurity server 170 is configured to generate a digest 153 of an executable file 154. In one embodiment, the executable file 154 is a dotnet executable file, i.e., an executable file that runs under the .NET software framework.

Generally speaking, the .NET software framework is available on computers that run the Microsoft Windows™ operating system. The .NET software framework includes a class library named as Framework Class Library (FCL) and provides language interoperability across several programming languages. A dotnet executable file executes in a software environment (in contrast to a hardware environment) named the Common Language Runtime (CLR), which is an application virtual machine. In one embodiment, the digests 153 disclosed herein are calculated from dotnet executable files.

A dotnet source code may be written in a suitable programming language, such as the Visual Basic programming language or C# programming language. The dotnet source code is compiled using a suitable compiler to generate a Common Intermediate Language (CIL) bytecode and metadata of the bytecode. CIL, formerly referred to as the Microsoft Intermediate Language (MSIL), is an intermediate language. A dotnet executable file, which includes the metadata and the CIL bytecode, may be in the PE file format.

Generally speaking, bytecode is program code that is configured to be executed by an application virtual machine, instead of by a hardware processor of a computer. The CLR application virtual machine includes a just-in-time (JIT) compiler that compiles the CIL bytecode to native code of the hardware processor at runtime.

The cybersecurity server 170 may receive the executable file 154 from a user-submission, a request to evaluate the executable file 154 for malware, a third-party feed, or from other internal or external source. In the example of FIG. 1, the cybersecurity server 170 receives the executable file 154 (see arrow 181) from a computer 163 over the Internet.

In the example of FIG. 1, the cybersecurity server 170 includes a preprocessor 171 and a fuzzy hash generator 172, which are implemented as instructions that are executed by the processor of the cybersecurity server 170. The preprocessor 171 may be configured to receive the executable file 154 (see arrow 182). The executable file 154 may include bytecode and metadata of the bytecode. The preprocessor 171 may be configured to extract strings from the metadata of the executable file 154, sort the extracted strings, merge the sorted strings to form data streams, and merge the data streams to form a combined data stream.

The fuzzy hash generator 172 receives the combined data stream from the preprocessor 171 (see arrow 183) and calculates a digest of the combined data stream to generate the digest 153 (see arrow 184) of the executable file 154. More particularly, the digest 153 that is used to represent the executable file 154 is calculated from the combined data stream generated by the preprocessor 171 from the metadata, instead of the entirety, of the executable file 154.

As its name indicates, the fuzzy hash generator 172 employs a fuzzy hashing algorithm, such as a locality-sensitive hashing algorithm, to calculate a digest of the data being hashed. In one embodiment, the fuzzy hash generator 172 employs the Trend Micro Locality Sensitive Hash (TLSH) algorithm to calculate the digest 153 of the data stream. Open source program code for implementing the TLSH algorithm is available on the Internet.

Generally speaking, a locality-sensitive hashing algorithm may extract many very small features (e.g., 3 bytes) of the data being hashed and put the features into a histogram, which is encoded to generate the digest of the data. The mathematical distance between two digests may be measured to determine the similarity of the two digests, and hence the similarity of the corresponding data from which the digests were calculated. The shorter the distance, the more similar the digests. The distance may be compared to a predetermined distance threshold to detect similarity. Open source program code of the TLSH algorithm includes a distance measurement function, which may be used to determine similarity between two digests 153 that were calculated using the TLSH algorithm.

The similarity of a target digest 153 (i.e., calculated from a dotnet executable file being evaluated) to a malicious digest 153 (i.e., calculated from a malicious dotnet executable file) may be determined to detect whether or not the target digest 153 is also malicious. For example, the distance between the digest 153 of the executable file 154 and a digest 153-1 of a malicious executable file may be measured and compared to a predetermined distance threshold. The executable file 154 may be deemed to be malware when the distance between the digest 153 and the digest 153-1 is less than the predetermined distance threshold.

A plurality of digests 153 (i.e., 153-1, 153-2, . . . ) may also be clustered to facilitate similarity determinations and to identify malware families. For example, the digests 153 may be grouped into clusters 152 (i.e., 152-1, 152-2, . . . ), with each cluster 152 comprising digests 153 that are similar to one another. The digests 153 may be grouped using a suitable clustering algorithm, such as the K-nearest neighbors (KNN) clustering algorithm, Density-based spatial clustering of applications with noise (DBSCAN) clustering algorithm, ANN clustering algorithm, hierarchical clustering algorithm, etc.

A cluster 152 may have a corresponding label that indicates whether the cluster 152 is good or malicious. A cluster 152 that only has malicious digests 153 or primarily (e.g., over 90% of its members) malicious digests 153 may be labeled as malicious. Similarly, a cluster 152 that only has good digests 153 (i.e., from known good dotnet executable files) or primarily good digests 153 may be labeled as good.

A center may be determined for each cluster 152. The center of a cluster 152, which is also in the format of a TLSH digest in this example, is representative of the digests 153 of the cluster 152. The center of the cluster 152 may be described as an average, median, or some other relationship between the members of the cluster, depending on the clustering algorithm employed.

A target digest 153 may be compared to the centers of the clusters 152 to find a cluster 152 with members that are most similar to the target digest 153. For example, in the case where the target digest 153 is most similar to a center of a malicious cluster 152, the target digest 153 may also deemed to be malicious. The target digest 153 may be deemed to be good when the target digest 153 is most similar to a center of a good cluster 152.

As can be appreciated from the foregoing, the plurality of digests 153 may be used individually or in clusters 152. In the example of FIG. 1, signatures 151 comprise the plurality of digests 153. The signatures 151 may be provided to an endpoint computer 161 to detect malicious executable files therein (see arrow 185). The endpoint computer 161 may be a user computer, a central server, or some other computer where malicious executable file detection is performed. The endpoint computer 161 may receive a target executable file, generate the digest of the target executable file as explained above with reference to the digest 153, and compare the resulting digest to the signatures 151. The target executable file may be deemed to be malware when its digest is similar to a malicious digest 153 or to members of a malicious cluster 152.

The signatures 151 may also be provided to a network security device 162 (see arrow 186). The network security device 162 may comprise a router, network appliance, or some other computing device that screens network traffic of a computer network. The network security device 162 may receive network traffic, extract a target executable file from the network traffic (e.g., at layer 7), generate a digest of the target executable file as explained above with reference to the digest 153, and compare the resulting digest to the signatures 151. The target executable file may be deemed to be malware when its digest is similar to a malicious digest 153 or to members of a malicious cluster 152.

Figure 2:
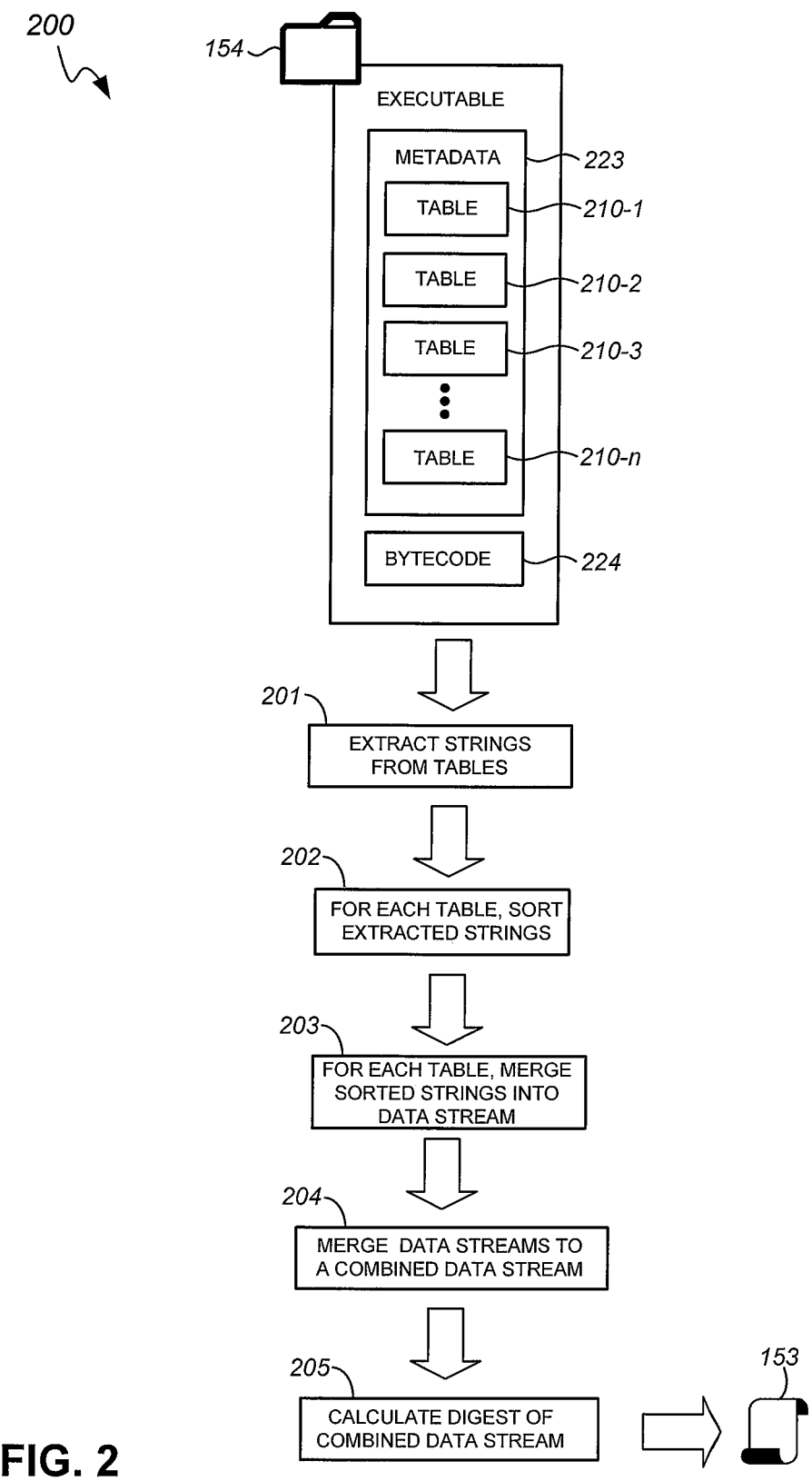
FIG. 2 shows a flow diagram of a method of generating a digest of an executable file in accordance with an embodiment of the present invention.

FIG. 2 shows a flow diagram of a method 200 of generating a digest 153 of an executable file 154 in accordance with an embodiment of the present invention. In the example of FIG. 2, the executable file 154 is a dotnet executable, which comprises metadata 223 and bytecode 224. The metadata 223 comprises a plurality of metadata tables 210 (i.e., 210-1, 210-2, . . . ). In one embodiment, the tables 210 include the "#Strings" table, the "US" table, the "#~" table, the "#GUID" table, and the #Blob table. The purpose and structure of these metadata tables are well-known in the art and not detailed here in the interest of clarity.

The #Strings table is a listing of strings of class names, function names, method names, field names, and other names that are referenced by entries in the #~ table. The #US table stores user-defined strings, i.e., strings defined by the programmer. In one embodiment, a digest of a dotnet executable file is calculated from strings that are extracted from the #Strings table and the #US table, and not from other portions of the dotnet executable. This advantageously focuses the digest to portions of the dotnet executable file that are less likely to change as the dotnet executable file is mutated or varied to evade detection.

In the example of FIG. 2, strings are extracted from the metadata table 210-1 and the metadata table 210-2 (step 201). In one embodiment, the metadata table 210-1 is the #Strings table and the metadata table 210-2 is the #US table. The strings extracted from the metadata table 210-1 are names that are referenced by entries in another metadata table 210, which in this example is the #~ table. The strings extracted from the metadata table 210-2 are user-defined strings. For each of the metadata tables 210-1 and 210-2, the extracted strings are sorted for normalization purposes (step 202). In one embodiment, the extracted strings are sorted in American Standard Code for Information Interchange (ASCII) code order. The strings may also be sorted in other predetermined sorting order without detracting from the merits of the present invention.

For each of the metadata tables 210-1 and 210-2, the sorted strings are merged into a data stream (step 203). In one embodiment, the sorted strings are merged into the data stream by concatenating the sorted strings into a single string. The data stream of the metadata table 210-1 and the data stream of the metadata table 210-2 are merged into a combined data stream (step 204). In one embodiment, the data streams are merged into the combined data stream by concatenating the data streams into a single data stream. For example, the data stream of the metadata table 210-2 may be appended to the data stream of the metadata table 210-1. The digest 163 of the combined data stream is calculated, e.g., using the TLSH algorithm.

FIGS. 3-7 provide an example of generating a combined data stream comprising strings of metadata in accordance with an embodiment of the present invention. FIGS. 3-7 provide a graphical illustration of the method 200.

Figure 3:
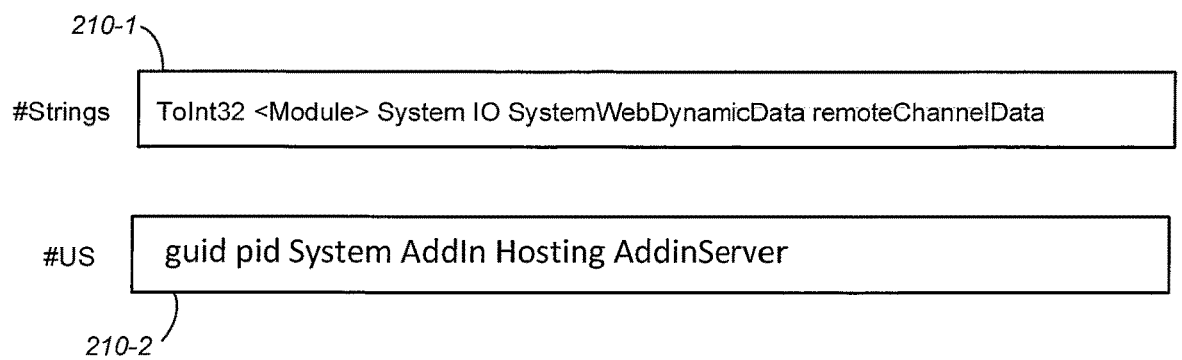
FIGS. 3-7 provide an example of generating a combined data stream comprising strings of metadata in accordance with an embodiment of the present invention.

FIG. 3 shows example contents of the metadata table 210-1 and the metadata table 210-2. In the example of FIG. 3, the metadata table 210-1 has the strings "ToInt32", "<Module>", "System", "IO", "SystemWebDynarnicData", and "RemoteChannelData". The metadata table 210-2 has the strings "guid", "pid", "System", "AddIn", "Hosting", and "AddinServer".

Figure 4:
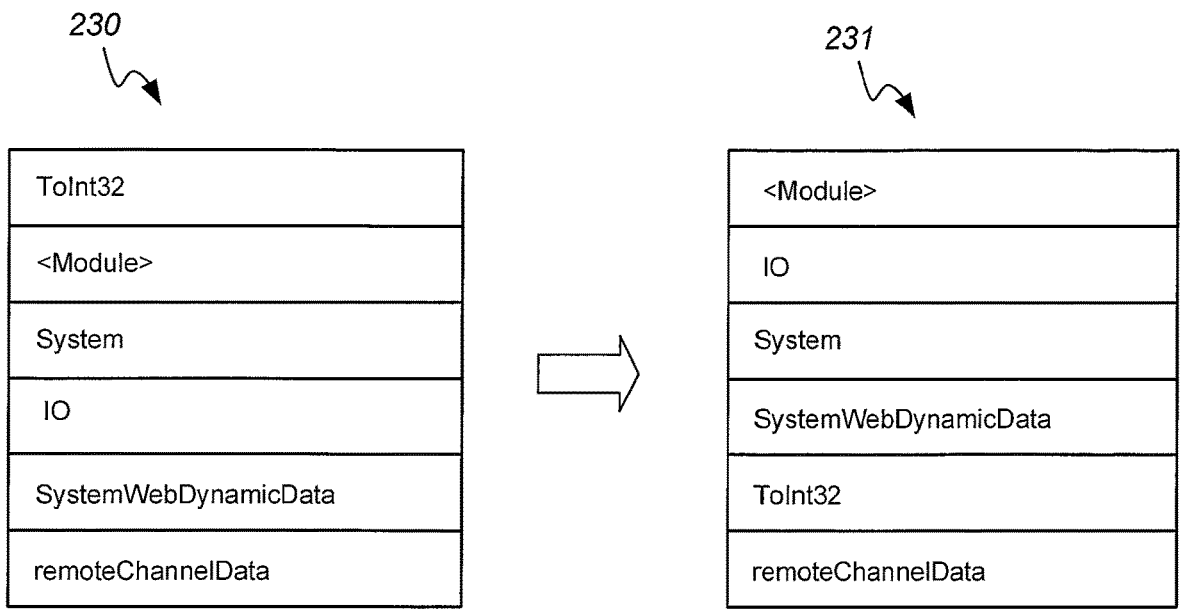

FIG. 4 illustrates sorting of the strings of the metadata table 210-1 in accordance with an embodiment of the present invention. The left-side list 230 shows the strings of the metadata table 210-1 (see FIG. 3, 210-1) before sorting, and the right-side list 231 shows the strings of the metadata table 210-1 after sorting in ASCII-code order.

Figure 5:
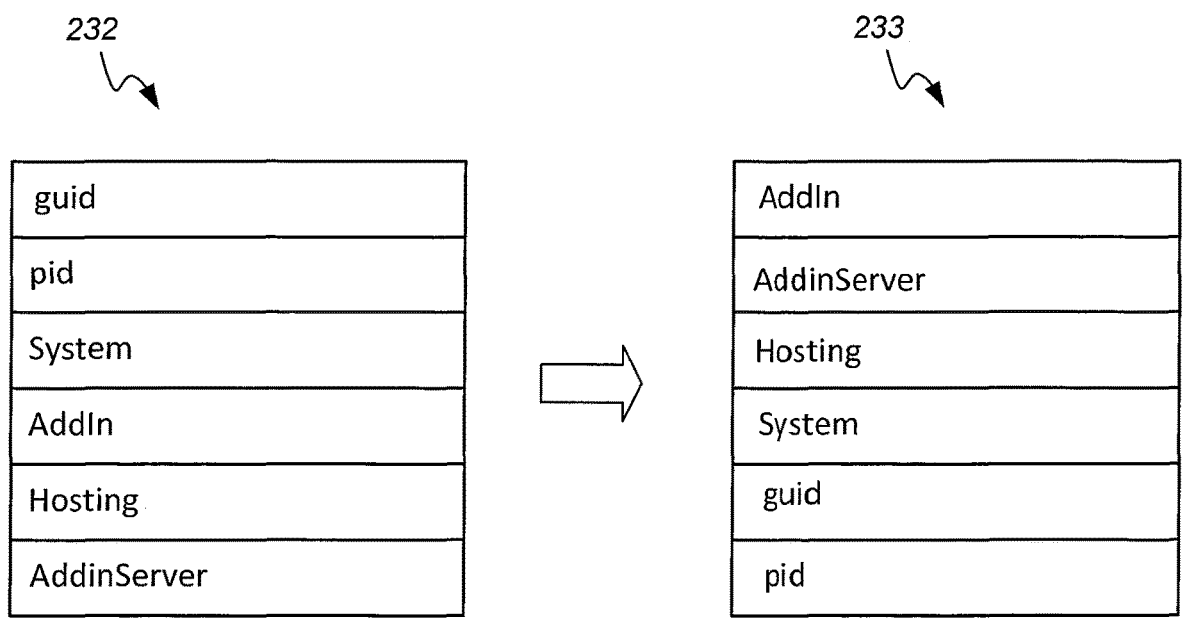

FIG. 5 illustrates sorting of the strings of the metadata table 210-2 in accordance with an embodiment of the present invention. The left-side list 232 shows the strings of the metadata table 210-2 (see FIG. 3, 210-2) before sorting, and the right-side list 233 shows the strings of the metadata table 210-2 after sorting in ASCII-code order.

Figure 6:
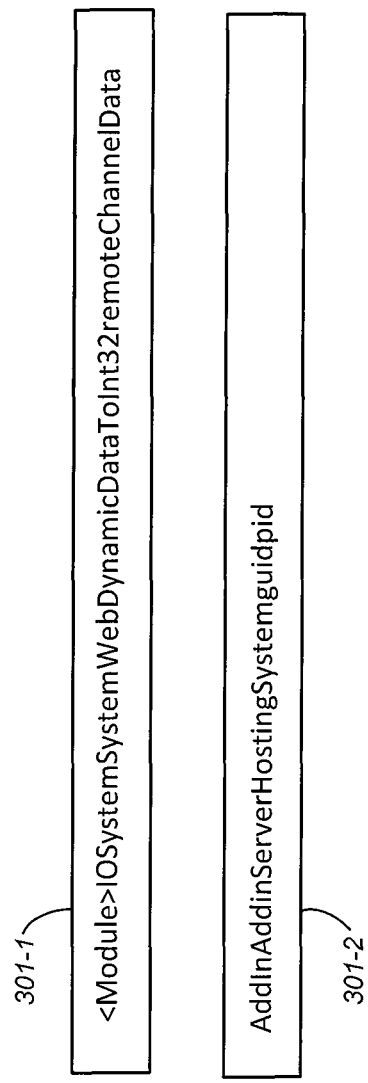

FIG. 6 illustrates merging of the sorted strings of the metadata tables 210-1 and 210-2 in accordance with an embodiment of the present invention. In the example of FIG. 6, the sorted strings of the metadata table 210-1 (see FIG. 4, list 231) are concatenated together into a single data stream 301-1. Similarly, the sorted strings of the metadata table 210-2 (see FIG. 5, list 233) are concatenated together into a single data stream 301-2.

Figure 7:
Figure 8:
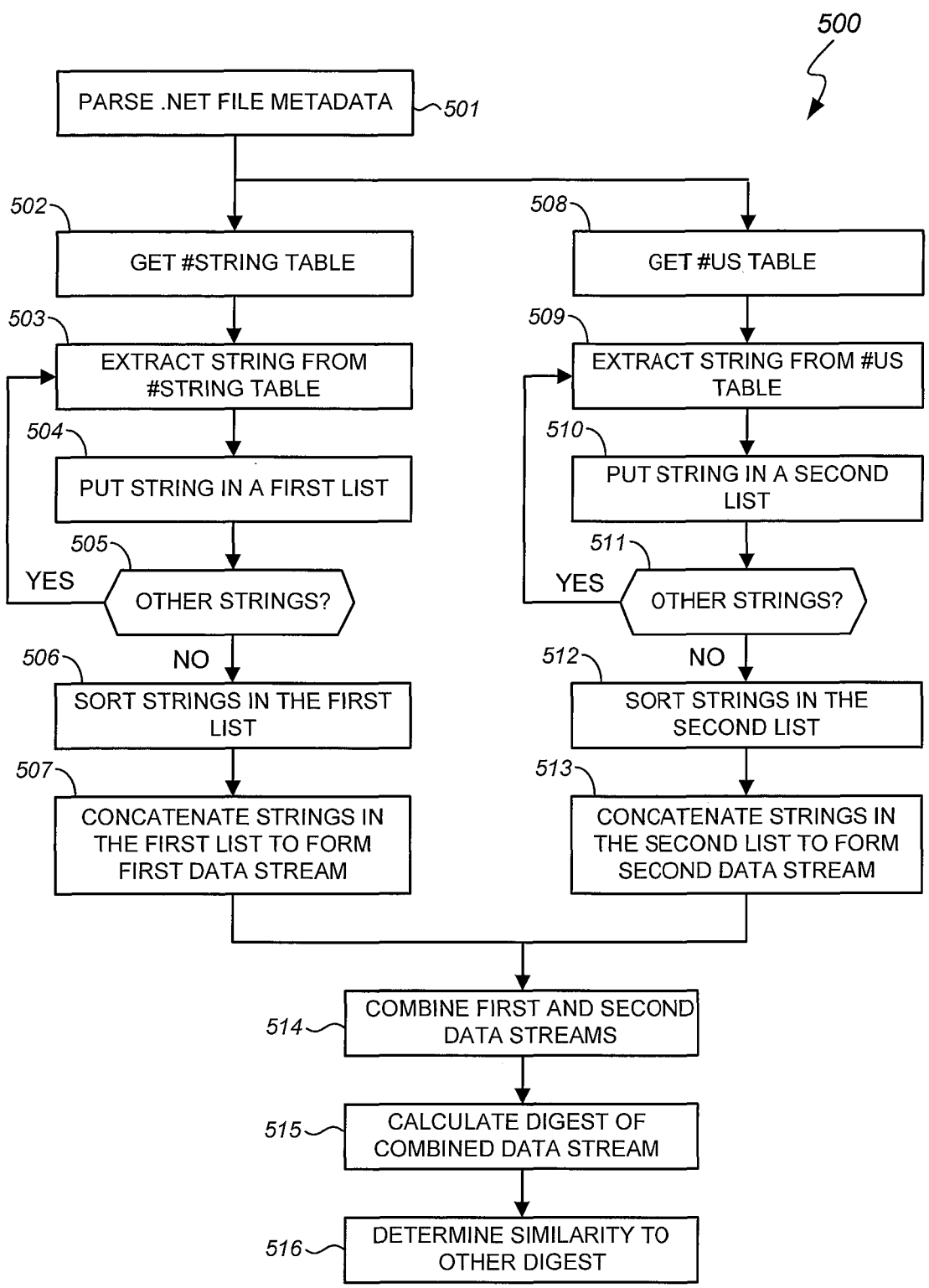
FIG. 8 shows a flow diagram of a method of identifying malicious executable files in accordance with an embodiment of the present invention.

FIG. 7 illustrates merging of the data streams of the metadata tables 210-1 and 210-2 in accordance with an embodiment of the present invention. In the example of FIG. 7, the data stream 301-1 of the metadata table 210-1 and the data stream 301-2 of the metadata table 210-2 are merged to form a combined data stream 302. The combined data stream 302 may be formed by concatenation, such as by appending the data stream 301-2 to the end of the data stream 301-1. The digest 153 of the data stream 302 may be calculated using the TLSH algorithm FIG. 8 shows a flow diagram of a method 500 of identifying malicious executable files in accordance with an embodiment of the present invention. The method 500 may be performed by the cybersecurity server 170 as programmed with the preprocessor 171 and the fuzzy hash generator 172. Other components may also be employed without detracting from the merits of the present invention.

In the example of FIG. 8, the metadata of a target dotnet executable file is parsed (step 501) to access the #String table (step 502) and the #US table (step 508). The processing of the #String table and the #US table may be performed in series or in parallel.

A string is extracted from the #String table (step 503) and put in a first list (step 504). The string extraction process is continued (step 505 to step 503) for all strings of the #String table. When all of the strings of the #String table have been extracted into the first list (step 505 to step 506), the strings in the first list are sorted in a predetermined sorting order (step 506). The sorted strings in the first list are concatenated to form a first data stream (step 507).

A similar process is performed for the strings of the #US table. More particularly, a string is extracted from the #US table (step 509) and put in a second list (step 510). The string extraction process is continued (step 511 to step 509) for all strings of the #US table. When all of the strings of the #US table have been extracted into the second list (step 511 to step 512), the strings in the second list are sorted in a predetermined sorting order (step 512). The sorted strings in the second list are concatenated to form a second data stream (step 513).

The second list is appended to the end of the first list to combine the first and second data streams (step 514). The digest of the combined data stream is calculated using a fuzzy hashing algorithm (step 515), such as the TLSH algorithm.

The similarity of the digest to a digest of another dotnet executable file may be determined to determine if the target dotnet executable file is malicious or a member of a particular malware family (step 516). For example, the target dotnet executable file is detected to be malicious when the digest is similar to a malicious digest or to members of a cluster of malicious digests. The target dotnet executable file is detected to be of the same malware family as malware dotnet executable files whose digests are members of a malicious cluster when the digest is similar to the members of the malicious cluster. Corrective action may be performed in response to detecting that the target dotnet executable file is malicious. For example, the target dotnet executable file may be prevented from being executed on a computer by putting the target dotnet executable file in quarantine, blocking network traffic that carries the target dotnet executable file, deleting the target dotnet executable file, etc.

Figure 9:
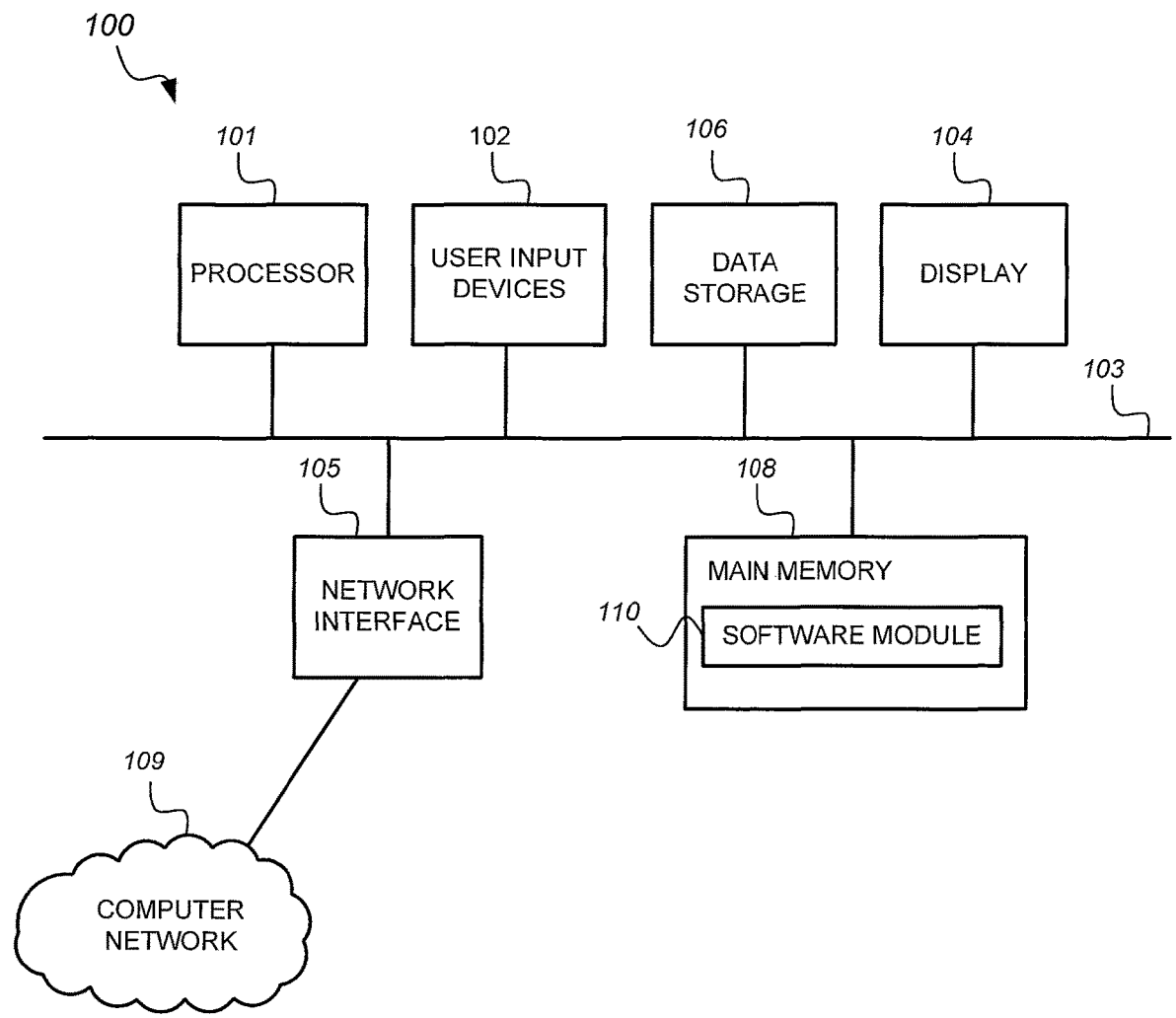
FIG. 9 shows a logical diagram of a computer system that may be employed with embodiments of the present invention.

Referring now to FIG. 9, there is shown a logical diagram of a computer system 100 that may be employed with embodiments of the present invention. The computer system 100 may be employed as a cybersecurity server or another computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a cybersecurity server, the software modules 110 comprise a preprocessor and a fuzzy hash generator.

Methods and systems for identifying malicious executable files have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying a malicious executable file, the method comprising:
receiving a dotnet (.NET) executable file that runs under the .NET software framework, the dotnet executable file comprising bytecode and a plurality of tables;
extracting a first set of strings from a first table of the plurality of tables, wherein the first table is a #Strings table of the dotnet executable file;
sorting the first set of strings into a first set of sorted strings;
merging the first set of sorted strings into a first data stream;
extracting a second set of strings from a second table of the plurality of tables, wherein the second table is a #US table of the dotnet executable file, the second set of strings comprises user-defined strings that are present in the bytecode, and the first set of strings comprises strings that are referenced by entries in a third table of the plurality of tables;
sorting the second set of strings into a second set of sorted strings;
merging the second set of sorted strings into a second data stream;
merging the first and second data streams into a combined data stream;
calculating a digest of the combined data stream using a locality-sensitive hashing algorithm; and
determining similarity of the digest to a malicious digest of a malicious dotnet executable file.

2. The method of claim 1, wherein the first and second sets of strings are sorted in ASCII-code order.

3. The method of claim 1, wherein merging the first and second data streams into the combined data stream comprises:
concatenating the first and second data streams.

4. The method of claim 1, wherein merging the first and second data streams into the combined data stream comprises:
appending the second data stream to the first data stream.

5. The method of claim 1, wherein each of the first set of strings and the second set of strings is merged by concatenation.

6. A system comprising:
a cybersecurity server comprising a processor and a memory, the memory storing instructions that when executed by the processor cause the cybersecurity server to:
receive a dotnet executable file that runs under the .NET software framework, the dotnet executable file comprising bytecode and a plurality of tables;
extract a first set of strings from a #Strings table of the dotnet executable file, the first set of strings comprising strings that are referenced by entries in a #~ table of the dotnet executable file;
sort the first set of strings to form a first set of sorted strings;
merge the first set of sorted strings into a first data stream;
merge the first data stream with a second data stream into a combined data stream, the second data stream comprising a second set of strings from a #US table of the dotnet executable file, wherein the second set of strings comprises user-defined strings that are present in the bytecode;
calculate a digest of the combined data stream using a locality-sensitive hashing algorithm; and
determine a similarity of the digest to a malicious digest of a malicious dotnet executable file.

7. The system of claim 6, further comprising:
a first computer that sent the dotnet executable file to the cybersecurity server over the Internet.

8. A method of identifying a malicious executable file, the method comprising:
receiving a dotnet executable file that runs under the .NET software framework, the dotnet executable file comprising bytecode and a plurality of tables;
extracting a first set of strings from a #Strings table of the dotnet executable file, the first set of strings comprising strings that are referenced by entries in a #~ table of the dotnet executable file;
sorting the first set of strings to form a first set of sorted strings;
merging the first set of sorted strings into a first data stream;
merging the first data stream with a second data stream to form a combined data stream, the second data stream comprising a second set of strings from a #US table of the dotnet executable file, wherein the second set of strings comprises user-defined strings that are present in the bytecode;
calculating a digest of the combined data stream using a locality-sensitive hashing algorithm; and
determining similarity of the digest to a malicious digest of a malicious dotnet executable file.

9. The method of claim 8, wherein determining the similarity of the digest to the malicious digest comprises measuring a distance between the digest and the malicious digest.

* * * * *